United States Patent [19]

Li et al.

[11] Patent Number: 5,683,148
[45] Date of Patent: Nov. 4, 1997

[54] BRAKE PIPE PNEUMATIC VALVE

[75] Inventors: Wei Li, Pittsburgh; Paul J. Boget, Murrysville, both of Pa.

[73] Assignee: Union Switch & Signal Inc., Pittsburgh, Pa.

[21] Appl. No.: 438,350

[22] Filed: May 10, 1995

[51] Int. Cl.⁶ .................................................. B60T 11/26
[52] U.S. Cl. ............................... 303/7; 303/47; 303/86; 285/65; 251/149.5
[58] Field of Search ............................. 353/47, 88.7, 65, 353/87, 88, 924; 251/149.5, 149.6, 149.9

[56] References Cited

U.S. PATENT DOCUMENTS

| | | | |
|---|---|---|---|
| 1,665,913 | 4/1928 | Durst | 303/86 |
| 4,319,787 | 3/1982 | Wickham . | |
| 4,763,875 | 8/1988 | Chew | 303/47 |
| 5,180,213 | 1/1993 | Kingsbury . | |
| 5,211,698 | 5/1993 | Winfrey | 303/47 |

*Primary Examiner*—Matthew C. Graham
*Attorney, Agent, or Firm*—Buchanan Ingersoll, P.C.

[57] ABSTRACT

A brake pipe pneumatic valve attachable to an end of a railway vehicle having a first flexible air hose for transmitting brake pipe pressure, and the end-of-train device with a second flexible air hose. The valve includes a housing having first, second, and third ports. The first port is releasably connectable to the first flexible air hose; the second port is releasably connectable with the second flexible air hose; and the third port is releasably matable with a coupling connected to a helper locomotive brake pipe. The valve includes a piston that divides the housing into first and second chambers. The first chamber communicates with the first and third ports; the second chamber communicates with the second port. Also, the piston has a channel therethrough connecting the first and second chambers. The valve further includes first biasing means, disposed between the housing and the piston, for selectably urging the piston towards sealing the first port. Second biasing means, disposed between the housing and the piston, for selectably urging the piston away from sealing the first port and acting to oppose the first biasing means is used, and is an operating pin. The valve includes coupling means attached to the housing releasably matable with a glad-hand coupling. The coupling means includes a mating surface with a protruding locking tongue, an aperture in communication with the third port, and a locking lip that is arranged with respect to the mating surface to form a locking channel.

27 Claims, 5 Drawing Sheets

1
BRAKE PIPE PNEUMATIC VALVE

BACKGROUND OF THE INVENTION

1. Field of the Invention

This invention relates to a brake pipe pneumatic valve, particularly, a brake pipe pneumatic valve for break-away operations, and more particularly, a brake pipe pneumatic valve for break-away operations having self-checking and quick exhaust features.

2. Description of the Prior Art

Each train with a conventional braking system is provided with a continuous closed brake pipe line which extends along the length of the train from the lead locomotive to the end-of-train vehicle. For cabooseless trains, the pressure in the last vehicle of the train may be measured and checked to ensure safe operation. For this purpose, an end-of-train (EOT) device typically is mounted on the last vehicle of the train. An EOT device is capable of sensing and monitoring the brake line pressure, and the presence of the last vehicle on the train. An EOT device can provide an output signal proportional to the air pressure within the brake pipe and transmit a report including the brake pipe air pressure to a remote display unit mounted in the lead locomotive of the train.

A detailed description of the conventional railroad train braking system is set forth in U.S. Pat. No. 4,763,875, which is incorporated herein by reference. In addition, a detailed description of an EOT device is set forth in U.S. Pat. No. 4,520,662, which is incorporated herein by reference.

When a freight train faces an especially long or steep grade, a helper or pusher locomotive can be coupled to the last vehicle of the train at the bottom of the incline to push the train up the grade until the lead locomotive extends beyond the crest of the incline by some predetermined car lengths. Regulations can require that the enginemen of the lead locomotive operate the brakes of the train, including the helper locomotive. Because of this, the EOT device on the last vehicle must either be removed or disconnected, the brake pipe glad hand connection on the last vehicle must be disconnected, and the brake pipe connections to the helper locomotive must be connected before the helper locomotive can assist the first train. At the top of the hill, the helper locomotive may be stopped to permit manual disengagement of the helper locomotive brake pipe hose from the first train and reconnection of EOT and first train brake pipe hose.

Recently, devices have been provided that permit helper locomotives to separate from the first train without stopping the train when the pushing or pulling is no longer needed. This operation can save railroads both the time and the energy required to restart the train. One approach, exemplified in U.S. Pat. No. 5,180,213 to Kingsbury, provides a special valve that allows the brake pipe of the train to be coupled to that of the helper locomotive without a loss of air in the brake pipe on initial coupling and upon decoupling. This valve allows an air-tight coupling to the brake pipe hose at the end of the train before a pneumatic communication is established with the brake pipe of the helper locomotive. The design is such that when the helper locomotive decouples, the brake hose coupling has a break-away connection that prevents significant loss of air pressure in the brake pipe of the train, allowing on-the-fly decoupling of the helper locomotive.

While the Kingsbury approach accomplishes the stated goals of allowing the enginemen in the lead locomotive to control the brakes of the helper locomotive, the valve requires both operating air from the helper locomotive's main reservoir to operate the valve and a connection to the helper locomotive's actuating pipe, which pressurizes upon the pressurization of the air brake in the helper locomotive. Other methods for break-away on-the-fly systems can include using a radio link and air pressure control techniques to adapt the air pressure of the helper locomotive to that of the train; using a solenoid-controlled valve, instead of the air-pressure-controlled valve to connect and disconnect the two brake pipes; and using wire link and air pressure control techniques to have the locomotive brake pipe follow the pressure change in the train brake pipe. Such methods may require heavy capital investment of the railroads if new equipment is required for the train, may interfere with the locomotive's normal operation if required to use the locomotive electronics or if the locomotive brake pipe cannot be shut off, or may not be sufficiently robust in the harsh railroad environment.

SUMMARY OF THE INVENTION

The invention herein provides a brake pipe pneumatic valve attachable to an end of a railway vehicle having an end-of-train device. The railway vehicle can have a first flexible air hose for transmitting brake pipe pressure, and the end-of-train device can have a second flexible air hose. The valve can include a housing having a first port, a second port, and a third port. The first port can be releasably connectable to the first flexible air hose and the second port can be releasably connectable with the second flexible air hose. The third port can be releasably matable with a glad-hand coupling, which can be connected to the brake pipe of a helper locomotive.

The valve can include a piston movably disposed within the housing and dividing said housing into a first chamber and a second chamber. The first chamber can communicate with the first and third ports, and the second chamber can communicate with the second port. Also, the piston can have a channel therethrough connecting the first chamber to the second chamber. The valve further includes first biasing means for selectably urging the piston towards sealing the first port, thereby substantially isolating the first port from the third port.

The first biasing means can be disposed between the housing and the piston. The first biasing means includes a locating pin, the diameter of the locating pin being generally smaller than the diameter of the channel. The locating pin can be at least partially engaged in said channel. A spring can be disposed around the locating pin between the housing and the piston. In addition to the first biasing means, second biasing means for selectably urging the piston away from sealing the first port can also be used. The second biasing means can be disposed between the housing and the piston, and act in opposition to the first biasing means. The second biasing means includes at least one operating pin contactable with the piston, a portion of the operating pin extending outside of the housing for forcible contact therewith, which forcible contact urging the piston away from the first port.

Furthermore, the valve includes coupling means attached to the housing and being releasably matable with a glad-hand coupling. The coupling means can include a mating surface from which a locking tongue can protrude. The mating surface can include an aperture in communication with the third port. The mating surface can also have a locking lip that is arranged with respect to the mating surface to form a locking channel. The mating surface can have an operating land for forcibly contacting the operating pin of another valve. The valve can include a bleeder valve connected to the first port for providing selectable communication between the first port and the atmosphere.

In another embodiment of the present invention, the brake pipe pneumatic valve can be connected between a first brake pipe on a first railway vehicle, and a second brake pipe on a second railway vehicle, with the first railway vehicle having a first flexible air hose connected to the first brake pipe and an end-of-train device to which a third flexible air hose is attached, and the second railway vehicle having a second flexible air hose connected to the second brake pipe.

The valve can include a first housing having a first port, a second port, and a third port, with the first port being connectable to the first flexible air hose, and the second port being connectable with the third flexible air hose. A first piston can be movably disposed within the first housing, thus dividing the first housing into a first chamber and a second chamber. The first chamber can communicate with the first and third ports, and the second chamber can communicate with the second port. The first piston can have a first channel therethrough connecting the first chamber and the second chamber.

The valve can have first biasing means for selectably urging the first piston towards sealing the first port, thereby substantially isolating the first port and the second port from the third port. Also, the first biasing means can be disposed between the housing and the first piston. A second biasing means can be employed for selectably urging the first piston away from the first port. The second biasing means can be disposed between the first housing and the first piston in opposition to the first biasing means. A first coupling means can be attached to the first housing. The first coupling means can include a first mating surface from which a first locking tongue can protrude. The first mating surface can have a first aperture communicating with the third port, and a first operating land. The first mating surface can also have a first locking lip that is arranged with respect to the first mating surface to form a first locking channel.

The valve can also include a second housing having a fourth port, a fifth port, and a sixth port. The fourth port can be connectable with the fourth flexible air pipe on the end of the second railway vehicle, and the fifth port can be at least partially closed. A second piston can be movably disposed within the second housing, thereby dividing the second housing into a third chamber and a fourth chamber. The third chamber can communicate with the fourth and sixth ports. Also, the second piston can having a second channel therethrough connecting the third and fourth chambers.

A third biasing means can be employed for selectably urging the second piston towards sealing the fourth port and substantially isolating the fourth port from the sixth port thereby, the third biasing means being disposed between the second housing and the second piston. A fourth biasing means can be used for selectably urging the piston away from sealing the third port. The fourth biasing means can be disposed between the second housing and the second piston in opposition to the third biasing means.

A second coupling means can be attached to the second housing. The second coupling means can include a second mating surface from which a second locking tongue can protrude. The second mating surface can have a second operating land and can have a second aperture communicating with the sixth port. The second mating surface can also have a second locking lip that is arranged with respect to the second mating surface to form a second locking channel.

In this embodiment, the first and second coupling means are each adapted to be matably connected to the other. The first tongue can be releasably received into the second locking channel and secured by the second locking lip; the second tongue can be releasably received into the first locking channel and secured by the first locking lip. The second operating land is adapted to forcibly contact the first operating pin, thus allowing the first port to communicate with the third port. Likewise, the first operating land is adapted to forcibly contact the second operating pin, thus allowing the fourth port to communicate with the sixth port. The first mating surface is adapted to mate with the second mating surface, with the first aperture being aligned with the second aperture so that the third and sixth ports can communicate thereby.

DETAILED DESCRIPTION OF THE PREFERRED EMBODIMENTS

The invention herein provides for a brake pipe pneumatic valve which is attachable to a railway vehicle and an end-of-train (EOT) device. The railway vehicle can have a first flexible air hose, and the EOT device can have a second flexible air hose. When used alone on a railway vehicle, the valve can act as a check valve which inhibits the escape of pressurized brake pipe air to the atmosphere. The valve may also act as a quick-exhaust valve under the control of the EOT unit. When used in conjunction with a second breakaway valve according to the present invention, the first and second valves can function together as a single composite valve to provide an interconnection between railway vehicles, typically an end vehicle on a first railway vehicle and a helper locomotive. When connected, the first railway vehicle can control the brake pipe pressure of the helper locomotive. This facilitates control of the degree to which the helper locomotive assists the first railway vehicle by controlling the brakes of the helper locomotive. When the need for the cooperative functioning of the valves has passed, e.g., when the pushing operation has terminated and the helper locomotive separates from the end of the first railway vehicle, the valves can separate and remain with their respective vehicles, and provide rapid, affirmative closure of the brake pipe termination of either vehicle.

The valve can include a housing having a first port, a second port, and a third port. The first port can be connectable to the first flexible air hose of the vehicle brake pipe, and the second port can be connectable with the second flexible air hose which is attached to an EOT device. When connected to the EOT device by way of the second flexible air hose, the second port enables the EOT device to sense brake pipe pressure in the first flexible air hose. The second port can be plugged where it is desired to use the valve without an EOT device, such as, for example, on a helper locomotive.

A first break-away valve can be mated with an inverted second break-away valve, each valve having a coupling means suited to receive the coupling means of the other. The third port of each of the valves is disposed such that the third port of a first valve can sealably communicate with the third port of a second valve, when the two valves are so mated.

Figures 1, 2, 6:
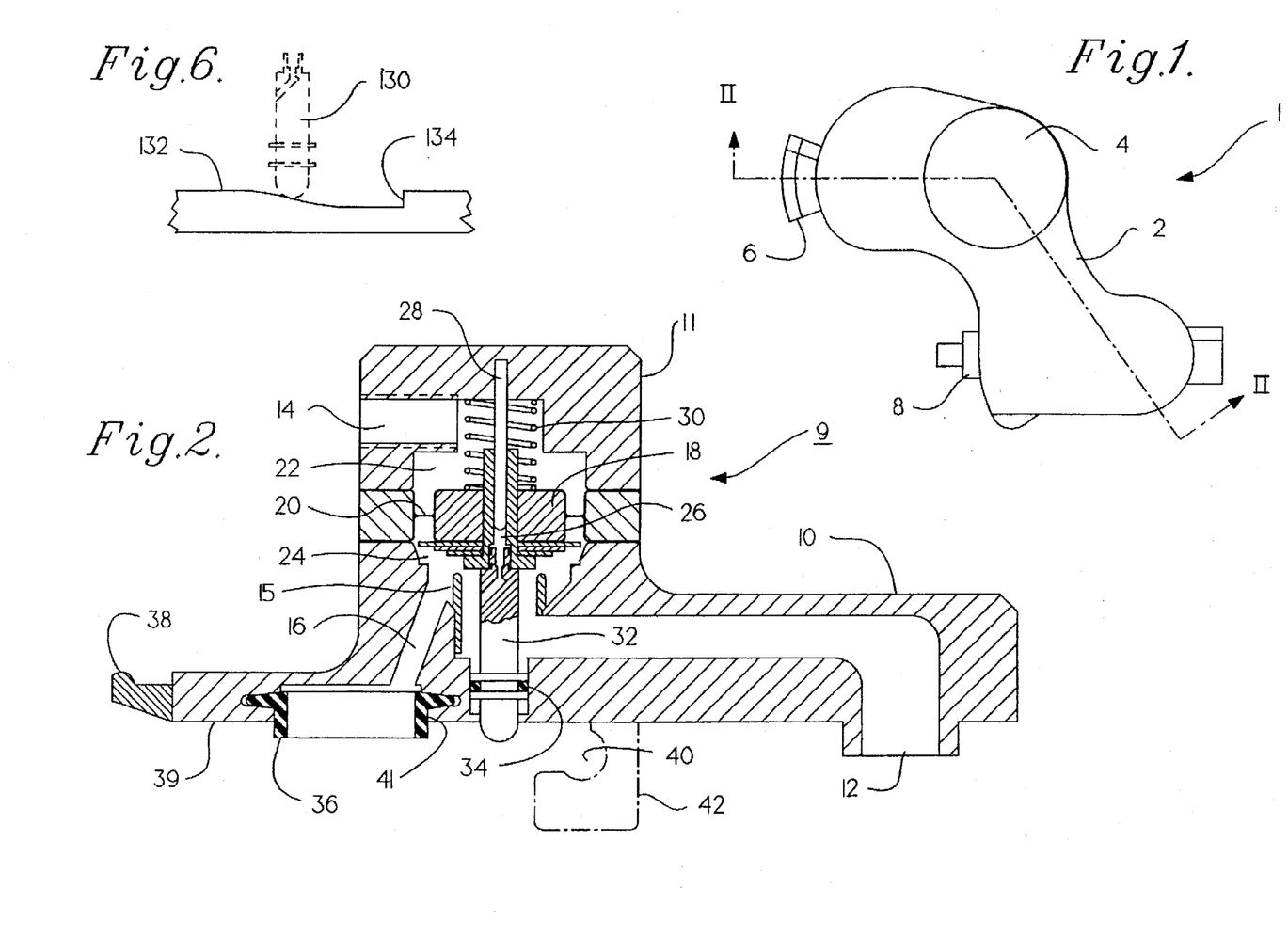
FIG. 1 is a top view of one embodiment of the valve according to the invention herein.
FIG. 2 is a sectional view of the valve in FIG. 1 along section line II—II.
FIG. 6 is a sectional view of the valve in FIG. 3 along section line VI—VI.

FIG. 1 illustrates one embodiment of break-away valve 1 according to the present invention. As seen from the top, valve 1 can include a valve body 2, and a housing 4. Valve body 2 can be attached to locking tongue 6 and bleed valve 8. FIG. 2 shows a sectional view of break-away valve 1 along chain line II—II, as seen in FIG. 1. In FIG. 2, valve body 10 of break-away valve 9 can be attached to housing 11 which can have a first port 12, second port 14, and third port 16. Within housing 11 can be disposed piston 18, which can divide the interior of housing 11 into first chamber 22 and second chamber 24.

Diaphragm 20 can be disposed around the periphery of piston 18 to provide a seal between first chamber 22 and second chamber 24. Piston 18 can have channel 26 which can be used to permit first port 12 to communicate with second port 14. A first biasing means, which can include locating pin 28 and spring 30 can be used to selectably urge piston 18 towards seat 15 of first port 12 thereby substantially isolating first port 12 from third port 16. To facilitate alignment of piston 18 with first port 12, the diameter of locating pin 28 can be generally smaller than the diameter of channel 26, and locating pin 28 can be disposed within channel 26 in piston 18. To facilitate the sealing of piston 18 against seat 15 of first port 12, spring 30 can be disposed around locating pin 28, and between housing 11 and piston 18.

When valve 9 is operated alone, with first port 12 being connected to a pressurized brake pipe line, brake air enters through first port 12. Typically, first biasing means 28, 30 holds piston 18 against seat 15 of first port 12 substantially isolating first port 12 from third port 16. Channel 26 in piston 18 can enable the brake air in first port 12 to pressurize first chamber 22 and second port 14, from which the brake pressure may be sensed by the EOT device. When the EOT device initiates a quick exhaust of the brake pipe, the EOT device reduces the pressure at second port 14 to approximately atmospheric pressure, and the pressure differential between first port 12 and second port 14 forces piston 18 away from sealing with seat 15 of first port 12, allowing port 12 to communicate with third port 16, and brake air to pass to atmosphere. The air exhaust continues until the force from first biasing means 28, 30 overcomes the residual brake pressure at first port 12,. causing piston 18 to seal against seat 15 of port 12.

Second biasing means 32 can be used for selectively urging piston 18 away from seat 15 of first port 12, thus permitting first port 12 to communicate with third port 16. Second biasing means 32 can be an operating pin which can have an O-ring 34 therearound to retard the leakage of air from first port 12 through valve body 10 to the atmosphere. Break-away valve 9 also provides a coupling means that is releasably matable with the glad-hand coupling. The coupling means can include locking tongue 38, mating surface 39, locking channel 40, and locking lip 42. Locking tongue 38 can be adapted such that, when inverted, it can be received by a locking channel and a locking lip on a glad-hand coupling, or may also be received by locking channel 40 and locking lip 42 of a second break-away valve 9. Mating surface 39 is adapted to releasably mate with the mating surface of the second, inverted, break-away valve 9. Mating surface 39 can have a generally annular orifice 41 which communicates with third port 16, and which is disposed generally between locking tongue 38 and locking lip 42. The location of orifice 42 is such that it can communicate with a similar orifice in the second valve 9 when so mated. To retard the leakage of air from third port 16, compressible annular seal 36, which may be rubber, can be provided within annular orifice 41. Seal 36 can provide for sealably mating and communicating between the third ports of two mated valves.

Figure 3:
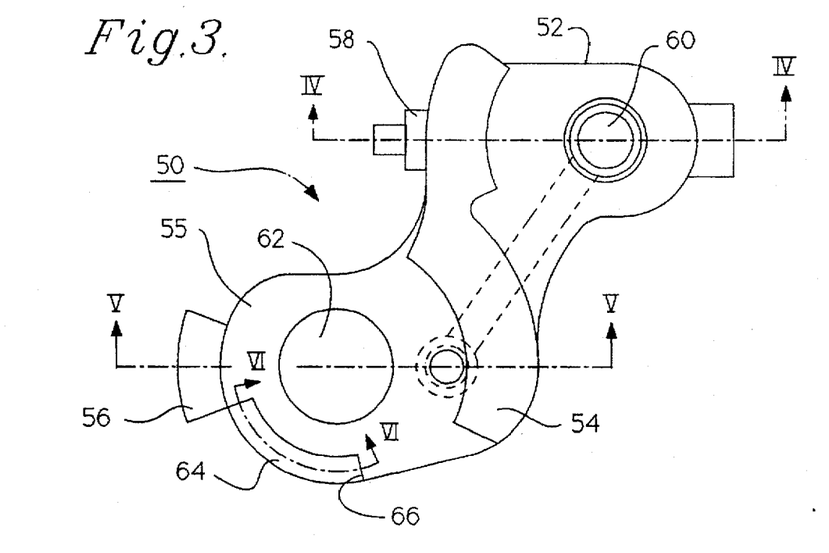
FIG. 3 is a bottom view of the valve in FIG. 1.

FIG. 3 shows a bottom view of the embodiment of the break-away valve 50 as shown in FIGS. 1 and 2. The coupling means can be seen more clearly from this vantage, and includes locking lip 54, mating surface 55, and locking tongue 56. From this perspective, the locking channel is generally hidden from view by locking lip 54. Mating surface 55 can include operating land 64 and detent 66. The surface of land 64 can be generally even with mating surface 55. Land 64 can form a sloping groove on mating surface 55, terminating at detent 66. Land 64 is suited for motivating an operating pin such as operating pin 32 in FIG. 2. Also shown in FIG. 3 is bleeder valve 58, which can selectably permit the release of air entering through first port 60 to the atmosphere. Annular orifice 62, which communicates with the valve's third port (not shown), can generally be disposed in mating surface 55 between locking lip 54 and locking tongue 56.

The orientation of locking tongue 56 of a first breakaway valve 50 can be such that it is received in the locking channel of a second break-away valve 50 and secured by locking lip 54 of the second break-away valve 50. Likewise, locking tongue 56 of the second break-away valve 50 can be received by the locking channel of the first break-away valve 50 and secured by locking lip 54 of the first break-away valve 50. When two such valves are releasably mated together, one valve is generally inverted with respect to the other valve. In addition, orifice 62 on first valve 50 is oriented such that it can communicate with orifice 62 of a second valve 50, when so mated. The coupling means of first valve 50 is adapted to mate with the coupling means of a second valve 50 which would be inverted relative to the first valve 50. In one embodiment of the present invention, the coupling means is not adapted to mate with a standard brake pipe hose glad-hand coupling.

Figures 4, 5:
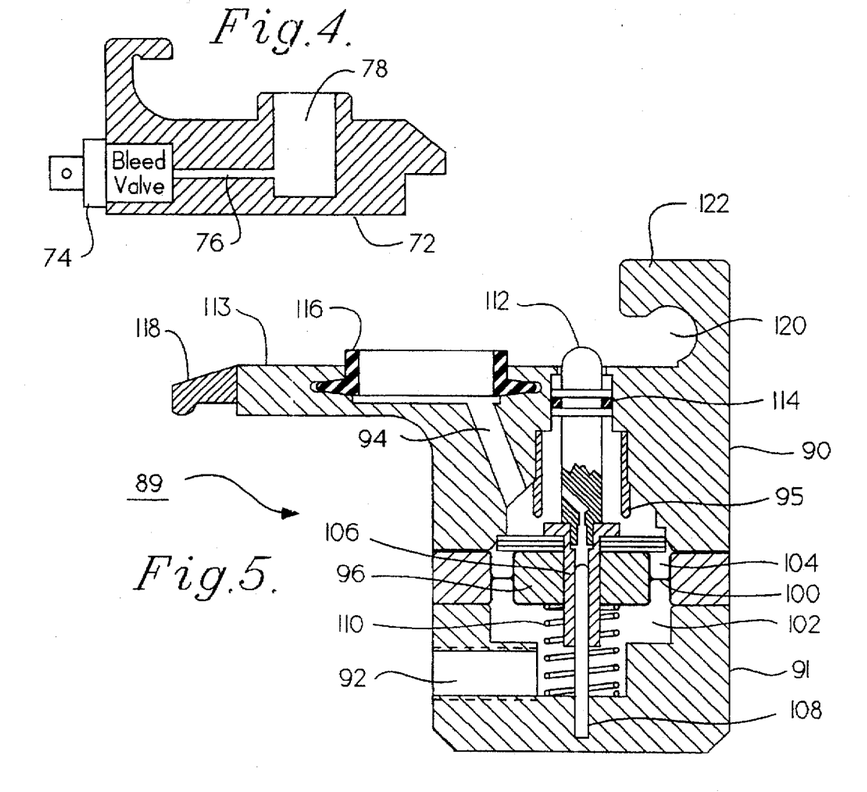
FIG. 4 is a sectional view of the valve in FIG. 3 along section line IV—IV.
FIG. 5 is a sectional view of the valve in FIG. 3 along section line V—V.

FIG. 4 views the portion of valve body 52 as sectioned through chain line IV—IV in FIG. 3. Air entering first port 78 can be selectably released to the atmosphere by operating bleed valve 74. Bleed valve 74 communicates with first port 78 through bleeder passage 76 in valve body 72.

FIG. 5 shows inverted break-away valve 89 as seen along the section illustrated by chain line V—V in FIG. 3. Similar to the view in FIG. 2, break-away valve 89 can include valve body 90, having housing 91 thereon. Similar to FIG. 2, piston 96 is disposed within housing 91 with piston 96 having a diaphragm 100 therearound thus separating housing 91 into first chamber 102 and second chamber 104.

Channel 106 is provided in piston 96 so that first port 92 can communicate with second port 93. First biasing means which can include locating pin 108 and spring 110 can urge piston 96 against seat 95 of first port 92 to prevent air from escaping through first port 91 to third port 94 when operating pin 112 is not engaged.

To retard the leakage of air from first port 92 to the atmosphere, O-ring 114 can be provided on operating pin 112. In addition, compressible annular seal 116 may be used to retard the leakage of air from third port 94 when mating surface 113 is mated with a similar mating surface of a similar valve or a glad-hand coupling. Also in FIG. 5 can be seen locking tongue 118 which is disposed to releasably mate with locking channel 120 and be secured by locking lip 122 of a second break-away valve. Operating pin 112 can urge piston 96 away from seat 95 of first port 91, when pin 112 is forcibly engaged with a mating surface of a glad-hand coupling, such as the mating surface of a second valve, so that first port 91 can communicate with third port Otherwise, first biasing means 108, 110 can urge piston 96 against first port 91 so that first port 91 is substantially isolated from third port 94, thus preventing the escape of air through orifice 115.

FIG. 6 illustrates the manipulation of operating pin 130 in a first valve by forcible contact with operating land 132 in a second valve, and is seen from the vantage of the section indicated by chain line VI—VI in FIG. 3. Pin 130 is similar to pin 32 in FIG. 2; land 132 is similar to land 64 in FIG. 3, and detent 134 is similar to detent 66 in FIG. 3. As operating pin 130 of a first break-away valve rides along operating land 132 of a second break-away valve, and away from detent 134, operating pin 130 moves up relative to operating land 132. Referring back to FIG. 2, by moving operating pin 32 upwards with respect to valve body 10, piston 18 is urged away from sealing with seat 15 of first port 12 so that first port 12 and third port 16 can communicate thereby.

Figure 7:
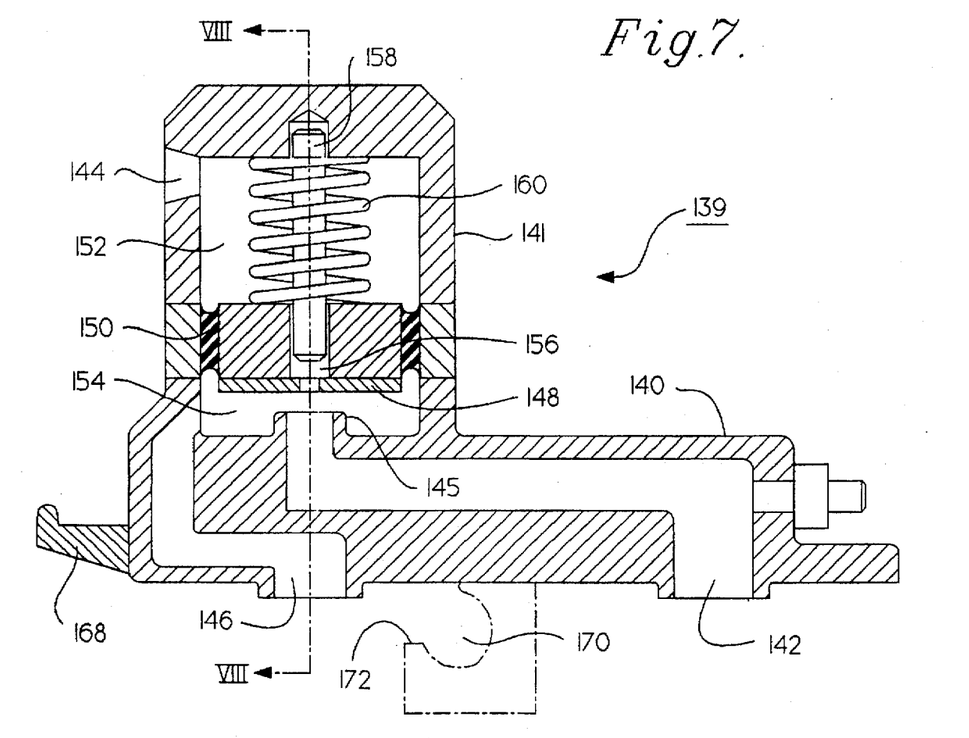
FIG. 7 is a sectional view of a second embodiment of the valve according to the invention herein.

A second embodiment of break-away valve 139 according to the present invention is seen in FIG. 7. Valve body 140 can include housing 141 which has first port 142, second port 144, and third port 146. Disposed within housing 141 can be piston 148. Piston 148, and diaphragm 150 therearound, can divide the interior of housing 141 into first chamber 152 and second chamber 154. To facilitate the communication of first port 142 with second port 144, piston 148 can have channel 156 disposed therethrough.

Similar to the first embodiment seen in FIG. 2, a first biasing means, which can include locating pin 158 and spring 160, can urge piston 148 against seat 145 of first port 142 so that first port 142 is substantially isolated from third port 146. Also attached to housing 140 can be a coupling means including locking tongue 168 and locking channel 170 as defined by locking lip 172. Again, similar to FIG. 2, locking channel 170 and locking lip 172 are disposed to accept locking tongue 168 from a second break-away valve or a glad-hand coupling. Similarly, locking tongue 168 can be disposed such that it releasably mates with locking channel 170 and locking lip 172 of a second break-away valve.

Figure 8:
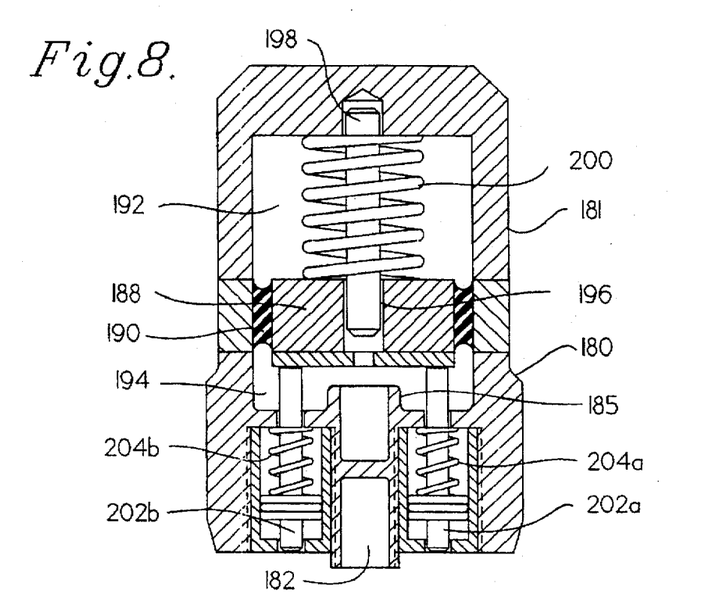
FIG. 8 is a sectional view of the second embodiment seen in FIG. 7 along the section line VIII—VIII in FIG. 7.

FIG. 8 illustrates a sectional view of FIG. 7 as indicated by chain line VIII—VIII. Valve body 180 can have housing 181 attached thereto. Piston 188 can be disposed within housing 181 and in conjunction with diaphragm 190 can divide housing 181 into first chamber 192 and second chamber 194. Similar to earlier embodiments, piston 188 may have channel 196 therethrough to facilitate communication between first port 182 and second port (not shown).

As in FIG. 7, first biasing means in FIG. 8 includes locating pin 198 and spring 200. However, unlike the embodiment seen in FIG. 2, second biasing means in FIG. 8 can include a first operating pin 202a and a second operating pin 202b. Normally, first biasing spring 204a retracts first operating pin 202b away from piston 188, and second biasing spring 204b retracts second operating pin 202b away from piston 188. If operating pins 202a, 202b are affirmatively engaged and pressed upward, relative to the orientation of piston 188 in FIG. 8, piston 188 is urged away from seat 185 of first port 182, thereby permitting first port 182 to communicate with second chamber 194 and, thus, the third port (not shown).

Figure 9:
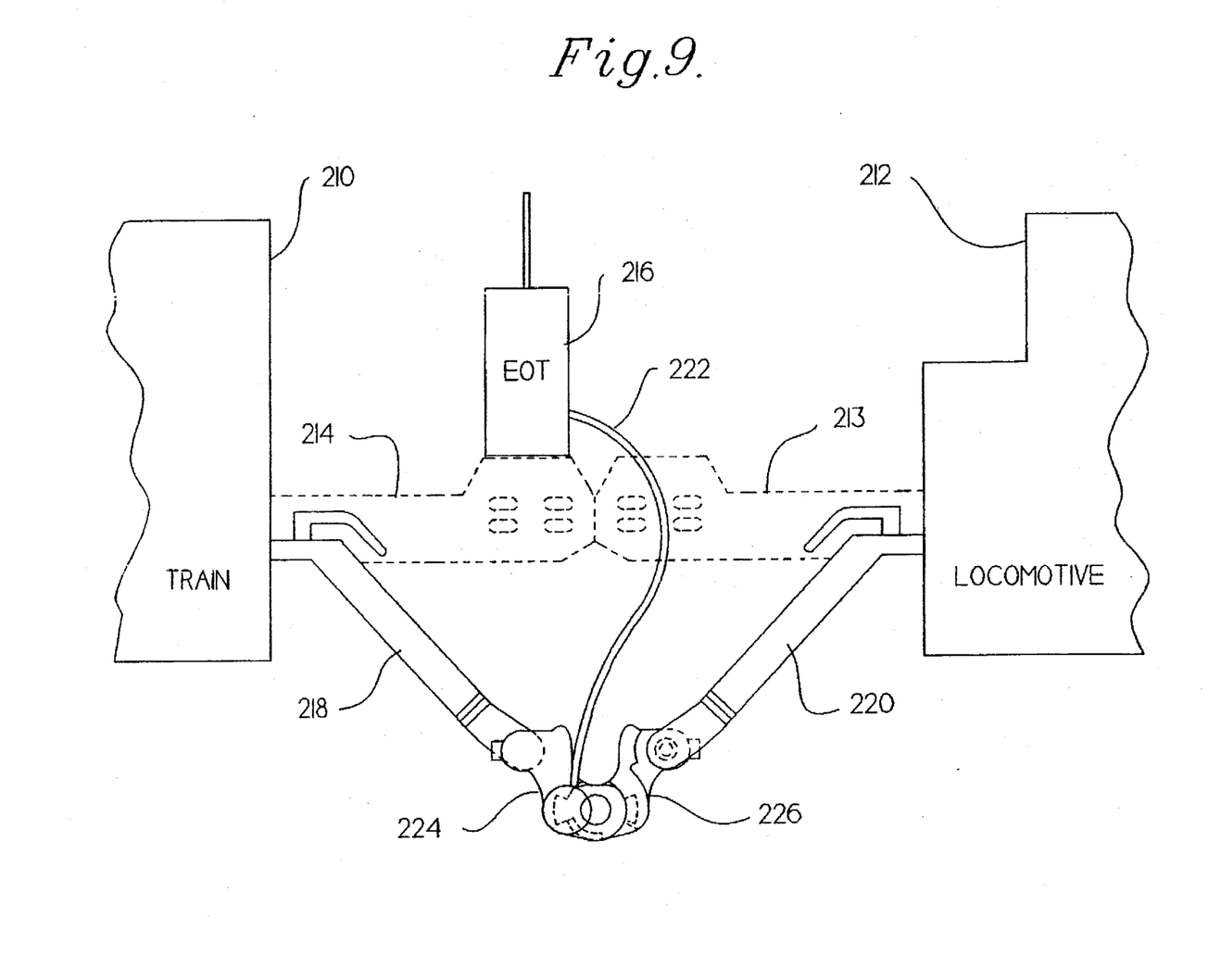
FIG. 9 is a diagram of one application of the valve according to the invention herein, illustrative of a pushing operation.

FIG. 9 illustrates the use of a break-away valve according to the invention herein in the context of the pushing operation of a helper locomotive. End vehicle 210 can be motivated by helper locomotive 212 with locomotive coupler 213 being connected to end vehicle coupler 214. In FIG. 9, end vehicle 210 has EOT device 216 mounted on coupler 214. Brake pipe air pressure can be communicated from end vehicle brake pipe hose 218 to helper locomotive brake pipe hose 220 by means of first break-away valve 224 and second break-away valve 226 which valves 224, 226 are releasably mated to one another. In addition, EOT device air pressure sensor hose 222 can be connected to the second port of first valve 224 so that EOT device 216 can monitor brake air pressure therein.

When first valve 224 is mated with respect to second valve 226, the operating pins on the respective valves are depressed forcing the pistons in the valves to be urged away from the seats in the respective valves' first ports. In this way, the brake pressure in hose 218 can be communicated to hose 220 for control of the brakes of helper locomotive 212 by the locomotive to which end vehicle 210 is associated. During the pushing operation, first valve 224 and second valve 226 are releasably mated and held in approximation by the interconnection of locking tongue of the first valve with the locking channel and locking lip of the second valve and vice versa. When the pushing operation has completed, it is desirable for locomotive 212 to break away from end vehicle 210.

Figure 10:
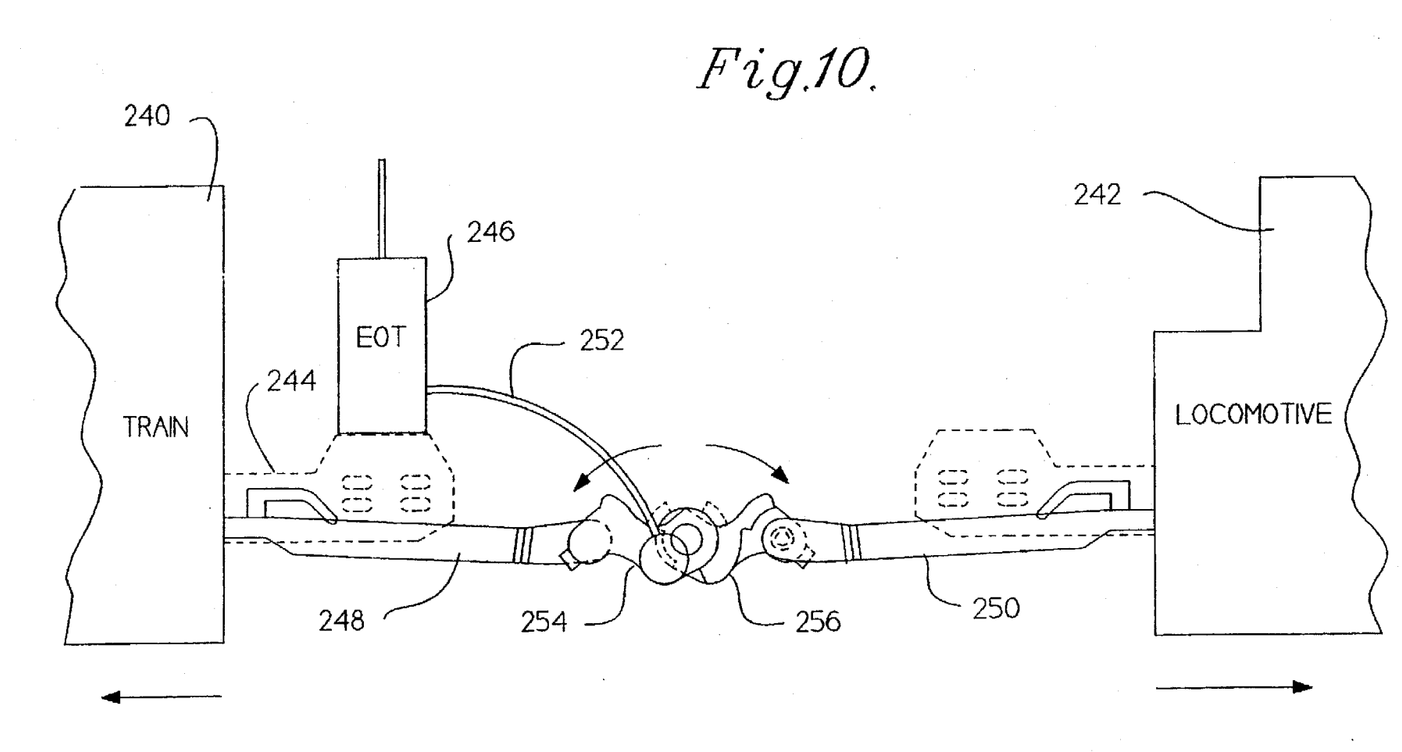
FIG. 10 is a diagram of one application of the valve according to the invention herein, illustrative of a breakaway operation subsequent to pushing.

FIG. 10 illustrates such a break away operation. Once the pushing operation has completed, end vehicle 240 can pull away from helper locomotive 242 causing tension to be applied to end vehicle brake pipe hose 248 and helper locomotive brake pipe hose 250, which are connected by respective first valve 254 and second valve 256. As locomotive 242 moves away relative to end vehicle 240, first valve 254 rotates relative to second valve 256 as indicated by the arcuate arrows, causing the locking tongue of first valve 254 to become generally disengaged from the locking channel and locking lip of second valve 256. Similarly, the locking tongue of second break-away valve 252 becomes generally disengaged from the locking channel and locking lip of first break-away valve 254.

As valves 254, 256 rotate relative to each other, the operating pins in the respective valves release the valve pistons so that the third ports become isolated from the first ports, thereby shutting off the air flow through, and closing, the respective valves. As viewed in FIG. 6, operating pin 130 on each valve rides land 132 towards detent 134. This action, when viewed from the perspective of FIG. 2, causes spring 30 generally to force piston 18 to seal against seat 15 of first port 12, thereby interrupting the communication between first port 12 and third port 16, and closing the valves, prior to the separation of valves 254, 256 in FIG. 10.

When vehicles 240 and 242 have moved away a sufficient amount, the tension on hoses 248 and 250 can be such that first valve 254 is forcibly separated from second valve 256. When this happens, the operating pins in the respective valves no longer urge the piston in the respective valve 254, 256 away from the first port thus permitting the first biasing means to quickly seat the valve piston against the first port. The air in respective brake hoses 218 and 220 can be inhibited from escaping to the atmosphere. In this way, valves 254 and 256 can act as simple check valves. The second port on valve 254 can be connected to EOT device 246 by EOT device air pressure sensor hose 252, thus preserving air pressure sensor for the train to which vehicle 240 is attached. Because helper locomotive 242 may not have a device comparable to EOT device 246, the second port of valve 256 may not be connected to an air hose and may be closed.

While certain present embodiments of the invention have been illustrated, it is understood that the invention is not limited thereto, and may be otherwise variously embodied and practiced within the scope of the following claims.

We claim:

1. A brake pipe pneumatic valve attachable to a railway vehicle having an end-of-train device, said railway vehicle having a first flexible air hose, said end-of-train device having a second flexible air hose, comprising:

a. a housing having a first port, a second port, and a third port, said first port being connectable to said first flexible air hose, said second port being connectable with said second flexible air hose;

b. a piston movably disposed within said housing and dividing said housing into a first chamber and a second chamber, said first chamber communicating with said first and third ports, and said second chamber communicating with said second port, said piston having a channel therethrough connecting said first chamber and said second chamber;

c. first biasing means for urging said piston towards sealing said first port and substantially isolating said first port from said third port thereby, said first biasing means being disposed between said housing and said piston;

d. second biasing means for selectably urging said piston away from sealing said first port, said second biasing means being in opposition to said first biasing means; and e. coupling means attached to said housing and communicating with said third port, said coupling means being releasably matable with a glad-hand coupling.

2. The brake pipe pneumatic valve of claim 1 wherein said first biasing means includes a locating pin, the diameter of said locating pin being generally smaller than the diameter of said channel, and said locating pin being at least partially engaged in said channel.

3. The brake pipe of claim 2 wherein said first biasing means further includes a spring disposed around said locating pin between said housing and said piston.

4. The brake pipe pneumatic valve of claim 2 wherein said second biasing means includes at least one operating pin contactable with said piston, a portion of said at least one operating pin extending outside of said housing for forcible contact therewith, said forcible contact urging said piston away from said first port.

5. The brake pipe pneumatic valve of claim 4 wherein said second biasing means includes a single operating pin contactable with said piston wherein said piston moves bidirectionally over a substantially linear path and wherein said operating pin is disposed through said first port and is positioned so as to move axially in a direction parallel with said piston linear path.

6. The brake pipe pneumatic valve of claim 4 wherein said second biasing means includes a plurality of operating pins contactable with said piston wherein said piston moves bidirectionally over a substantially linear path and wherein said operating pins are positioned so as to move axially in a direction parallel with said piston linear path.

7. The brake pipe pneumatic valve of claim 1 wherein said second biasing means includes at least one operating pin contactable with said piston, a portion of said at least one operating pin extending outside of said housing for forcible contact therewith, said forcible contact urging said piston away from said first port.

8. The brake pipe pneumatic valve of claim 1 wherein said first port is releasably connectable with a brake pipe hose.

9. The brake pipe pneumatic valve of claim 1 wherein said second port is releasably connectable with an end-of-train device.

10. The brake pipe pneumatic valve of claim 1 wherein said third port is releasably matable with a glad-hand coupling.

11. The brake pipe pneumatic valve of claim 10 wherein said third port is releasably matable with a helper locomotive brake pipe glad-hand coupling.

12. The brake pipe pneumatic valve of claim 1 further comprising a bleeder valve connected to said first port for providing selectable communication between said first port and the atmosphere.

13. The brake pipe pneumatic valve of claim 1 wherein said first port is releasably connected with the brake pipe of a train and said second port is releasably connected with an end-of-train device on said train.

14. The brake pipe pneumatic valve of claim 1 wherein said third port is releasably connected to the brake pipe of a helper locomotive.

15. The brake pipe pneumatic valve of claim 1 wherein said third port is releasably connected to the brake pipe of a helper locomotive.

16. The brake pipe pneumatic valve of claim 1 wherein said coupling means further includes a mating surface, a locking tongue protruding from said mating surface, a locking lip disposed on said mating surface set apart from said locking tongue, said locking lip being disposed on said mating surface to form a locking channel, said locking channel being adapted to matably receive an inverted one of said locking tongue of another brake pipe pneumatic valve.

17. A brake pipe pneumatic valve connected between a first brake pipe on a first railway vehicle and a second brake pipe on a second railway vehicle, said first railway vehicle having an end-of-train device, said first railway vehicle having a first flexible air hose, said second railway vehicle having a second flexible air hose, said end-of-train device having a third flexible air hose, said valve comprising:

a. a first housing having a first port, a second port, and a third port, said first port being connectable to said first flexible air hose, said second port being connectable with said third flexible air hose;

b. a first piston movably disposed within said first housing and dividing said first housing into a first chamber and a second chamber, said first chamber communicating with said first and third ports, and said second chamber communicating with said second port, said first piston having a first channel therethrough connecting said first chamber and said second chamber;

c. first biasing means for urging said first piston towards sealing said first port and substantially isolating said first port and said second port from said third port thereby, said first biasing means being disposed between said housing and said first piston;

d. second biasing means for selectably urging said first piston away from sealing said first port, said second biasing means being disposed between said first housing and said first piston in opposition to said first biasing means;

e. first coupling means attached to said first housing and communicating with said third port;

f. a second housing having a fourth port, a fifth port, and a sixth port, said fourth port being connectable with said second flexible air pipe on said end of said second railway vehicle, said fifth port being at least partially closed;

g. a second piston movably disposed within said second housing and dividing said second housing into a third chamber and a fourth chamber, said third chamber communicating with said fourth and sixth ports, said second piston having a second channel therethrough connecting said third chamber and said fourth chamber;

h. third biasing means for urging said second piston towards sealing said fourth port and substantially isolating said fourth port from said sixth port thereby, said third biasing means being disposed between said second housing and said second piston;

i. fourth biasing means for selectably urging said piston away from sealing said first port, said fourth biasing means being disposed between said second housing and said second piston in opposition to said third biasing means; and j. second coupling means attached to said housing, said second coupling communicating with said sixth port, said second coupling means being releasably matable with said first coupling means, said third port communicating with said sixth port thereby.

18. The brake pipe pneumatic valve of claim 17 wherein said first biasing means includes a locating pin, the diameter of said locating pin being generally smaller than the diameter of said channel, and said locating pin being engaged in said channel.

19. The brake pipe pneumatic valve of claim 18 wherein each of said second and fourth biasing means include at least one operating pin contactable with respective one of said first and second pistons, a portion of said at least one operating pin extending outside of respective of said first and second housing for forcible contact therewith, said forcible contact urging said first and second piston away from respective one of said first and fourth ports.

20. The brake pipe pneumatic valve of claim 17 wherein said second biasing means includes at least one operating pin contactable with said piston, a portion of said at least one operating pin extending outside of said housing for forcible contact therewith, said forcible contact urging said piston away from said first port.

21. The brake pipe pneumatic valve of claim 17 wherein said first port is releasably connectable with a brake pipe hose.

22. The brake pipe pneumatic valve of claim 17 wherein said second port is releasably connectable with an end-of-train device.

23. The brake pipe pneumatic valve of claim 17 wherein said third port is releasably matable with a glad-hand coupling.

24. The brake pipe pneumatic valve of claim 17 further comprising a bleeder valve connected to at least one of said first and fourth ports for providing selectable communication between said at least one of said first and fourth ports and the atmosphere.

25. The brake pipe pneumatic valve of claim 17 wherein each of said first port is releasably connected with the brake pipe of a train, said second port is releasably connected with an end-of-train device on said train, said third port is matably connected with said sixth port, and said fourth port is releasably connected to a helper locomotive brake pipe.

26. The brake pipe of claim 17 wherein said first and third biasing means further include respective first and second springs disposed around respective one of said first and second locating pin between respective one of said first and second housing and said first and second piston.

27. The brake pipe pneumatic valve of claim 17 wherein said first coupling means further includes a first mating surface having a first aperture in communication with said third port, a first locking tongue protruding from said first mating surface, a first locking lip disposed on said first mating surface set apart from said first locking tongue, said first locking lip being disposed on said first mating surface to form a first locking channel, said second coupling means further includes a second mating surface having a second aperture in communication with said sixth port, a second locking tongue protruding from said second mating surface, a second locking lip disposed on said second mating surface set apart from said second locking tongue, said second locking lip being disposed on said second mating surface to form a second locking channel, said first locking channel being adapted to matably receive said second locking tongue, said first locking lip being adapted to releasably fasten said second locking tongue in said first locking channel, said second locking channel being adapted to matably receive said first locking tongue, said second locking lip being adapted to releasably fasten said first locking tongue in said second locking channel, said first mating surface being adapted to matably receive said second mating surface, and said first aperture being generally aligned with said second aperture.

* * * * *